US012303746B1

(12) United States Patent
Hart

(10) Patent No.: US 12,303,746 B1
(45) Date of Patent: May 20, 2025

(54) BALL SPINNING DEVICE FOR DYNAMICALLY BALANCING A BALL

(71) Applicant: James William Hart, Waynesville, OH (US)

(72) Inventor: James William Hart, Waynesville, OH (US)

( * ) Notice: Subject to any disclaimer, the term of this patent is extended or adjusted under 35 U.S.C. 154(b) by 464 days.

(21) Appl. No.: 17/677,563

(22) Filed: Feb. 22, 2022

Related U.S. Application Data

(60) Provisional application No. 63/153,299, filed on Feb. 24, 2021.

(51) Int. Cl.

| | |
|---|---|
| ***A63B 45/02*** | (2006.01) |
| ***A63B 102/32*** | (2015.01) |
| ***B05B 1/04*** | (2006.01) |
| ***B05B 1/14*** | (2006.01) |
| ***B43K 23/00*** | (2006.01) |

(52) U.S. Cl.
CPC .............. *A63B 45/02* (2013.01); *B05B 1/044* (2013.01); *B05B 1/14* (2013.01); *B43K 23/001* (2013.01); *A63B 2102/32* (2015.10)

(58) Field of Classification Search
CPC ..... A63B 45/02; A63B 2102/32; B05B 1/044; B05B 1/14; B43K 23/001
USPC .......................................................... 73/65.02
See application file for complete search history.

(56) References Cited

U.S. PATENT DOCUMENTS

| | | | | |
|---|---|---|---|---|
| 4,111,038 A | | 9/1978 | Olson et al. | |
| 4,546,644 A | | 10/1985 | Beny et al. | |
| 4,688,427 A | * | 8/1987 | Hyland, Jr. | G01M 1/16 73/460 |
| D301,554 S | * | 6/1989 | Ogawa | D10/46 |
| 4,928,516 A | | 5/1990 | Movick | |
| D323,301 S | * | 1/1992 | Cheng | D10/46 |
| 5,705,740 A | * | 1/1998 | Unno | G01M 1/06 73/65.07 |
| 6,453,807 B1 | * | 9/2002 | Ramey | A63B 69/3688 101/DIG. 40 |

(Continued)

FOREIGN PATENT DOCUMENTS

| | | | | |
|---|---|---|---|---|
| CN | 103574777 B | * | 4/2016 | |
| GB | 2243696 A | * | 11/1991 | A63B 45/02 |

(Continued)

OTHER PUBLICATIONS

KR_20170021031 Feb. 17, 2017 (Year: 2017).*

(Continued)

*Primary Examiner* — Peter J Macchiarolo
*Assistant Examiner* — Monica S Young
(74) *Attorney, Agent, or Firm* — The Law Office of Patrick F. O'Reilly III, LLC

(57) ABSTRACT

A ball spinning device for dynamically balancing a ball includes a device body, the device body including a concave cup portion for receiving a portion of a ball that is to be dynamically balanced, the concave cup portion having an air discharge aperture configured to discharge a stream of pressurized air at an outer surface of the ball; and a pressurized air source fluidly coupled to the air discharge aperture of the concave cup portion, the pressurized air source configured to deliver the pressurized air to the air discharge aperture so as to induce a rotational displacement of the ball within the concave cup portion until a balanced state of the ball is achieved.

13 Claims, 12 Drawing Sheets

(56) References Cited

U.S. PATENT DOCUMENTS

| | | | | |
|---|---|---|---|---|
| 6,813,936 | B2 | 11/2004 | Burnett | |
| 6,971,263 | B1 | 12/2005 | Colman | |
| 7,299,685 | B1 * | 11/2007 | Burnett | A63B 69/3658 73/65.02 |
| 2003/0213289 | A1 * | 11/2003 | Burnett | A63B 47/008 73/65.02 |
| 2019/0022505 | A1 * | 1/2019 | Evans | A63B 1/00 |

FOREIGN PATENT DOCUMENTS

| | | | | | |
|---|---|---|---|---|---|
| JP | 2009291620 | A | * | 12/2009 | A63B 57/207 |
| KR | 101464210 | B1 | * | 11/2014 | |
| KR | 20170021031 | A | * | 2/2017 | |
| WO | WO-8503125 | A | * | 7/1985 | A63B 47/008 |

OTHER PUBLICATIONS

CN_103574777 Apr. 20, 2016 (Year: 2017).*

KR-101464210 Nov. 21, 2014 (Year: 2014).*

"Technasonic Check-Go Pro Sweet Spot Electronic Golf Ball Liner", Amazon Website, Web page <https://www.amazon.com/Technasonic-Check-Go-Sweet-Electronic-Liner/dp/B000IMDIAY>, p. 8, dated Apr. 7, 2005, retrieved from www.amazon.com website on Aug. 9, 2023.

* cited by examiner

BALL SPINNING DEVICE FOR DYNAMICALLY BALANCING A BALL

CROSS-REFERENCE TO RELATED APPLICATIONS

This patent application claims priority to, and incorporates by reference in its entirety, U.S. Provisional Patent Application No. 63/153,299, entitled "Ball Spinning Device For Dynamically Balancing A Ball", filed on Feb. 24, 2021.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a ball spinning device for dynamically balancing a ball. More particularly, the invention relates to a ball spinning device for dynamically balancing a ball that enables a ball balance point to be marked on the ball.

2. Background

No manufactured ball used in sports, such as a manufactured golf ball, is made perfectly balanced when produced at the factory. As such, manufactured golf balls will have a subtle or pronounced "heavy" side, thereby making the balls effectively slightly lopsided. Thus, a golf ball struck with any club will slightly wobble towards the heaviest side of the golf ball even while rolling or spinning in the air. Improved accuracy can be obtained if a golf ball balance point is identified and marked and then is aimed at a target, whether putted to a hole or when hit with a golf club at the tee box. Manufacturers of golf balls acknowledge that this problem exists, but do not mark the line of the heavy spot because it cannot be easily determined in a manufacturing setting, nor can it be seen or marked by a consumer without using a device to identify that spot. There have been several methods previously introduced that help to identify and mark the heavy spot on the ball so that this information can be used to the advantage of a golfer by aligning that heavy spot on the ball perpendicular to the face of the putter, a driver, or other club. The methods currently in use are not efficient and/or are incomplete in identifying in all cases the heavy spot of the ball. Also, these methods cannot be used in a manufacturing setting due to the time required to find the balance of a single ball. Some methods also require special chemicals to be used with the marking apparatus to identify the heavy spot on the ball. These are static methods. Other methods require a ball to sit on a plate which is spun that transfers the spinning motion to the ball, which then spins with the plate. These methods are not practical in a manufacturing setting as contact with the plate could mar the finished/painted golf ball.

Therefore, what is needed is a ball spinning device for dynamically balancing a ball that uses a contactless cushion of air to suspend the ball, while also simultaneously spinning the ball. Moreover, a ball spinning device is needed that allows the ball to be marked during the identification process, which results in a more accurately marked golf ball. Furthermore, what is needed is a ball spinning device that is able to quickly and easily mark a balanced equator line on a ball to achieve better play performance using the ball.

BRIEF SUMMARY OF EMBODIMENTS OF THE INVENTION

Accordingly, the present invention is directed to a ball spinning device that substantially obviates one or more problems resulting from the limitations and deficiencies of the related art.

In accordance with one or more embodiments of the present invention, there is provided a ball spinning device for dynamically balancing a ball. The ball spinning device includes a device body, the device body including a concave cup portion for receiving a portion of a ball that is to be dynamically balanced, the concave cup portion having an air discharge aperture configured to discharge a stream of pressurized air at an outer surface of the ball; and a pressurized air source fluidly coupled to the air discharge aperture of the concave cup portion, the pressurized air source configured to deliver the pressurized air to the air discharge aperture so as to induce a rotational displacement of the ball within the concave cup portion until a balanced state of the ball is achieved.

In a further embodiment of the present invention, the air discharge aperture is spaced a predetermined distance apart from a center point of the concave cup portion.

In yet a further embodiment, the air discharge aperture is circular in shape.

In still a further embodiment, the air discharge aperture comprises an elongate slot.

In yet a further embodiment, the device body further comprises an internal air chamber fluidly coupled to the air discharge aperture, the internal air chamber configured to hold a volume of pressurized air so as to minimize a disruption to the rotational displacement of the ball when the pressurized air source cycles on and off.

In still a further embodiment, the device body further comprises an air passageway fluidly coupling the internal air chamber to the air discharge aperture.

In yet a further embodiment, the pressurized air source comprises an air compressor configured to deliver the pressurized air to the air discharge aperture so as to induce the rotational displacement of the ball.

In still a further embodiment, the pressurized air source comprises a fan configured to deliver the pressurized air to the air discharge aperture so as to induce the rotational displacement of the ball.

In yet a further embodiment, the fan comprises an axial fan configured to discharge the pressurized air parallel to a rotational axis of the axial fan.

In still a further embodiment, the fan comprises a centrifugal fan configured to discharge the pressurized air perpendicular to a rotational axis of the centrifugal fan.

In yet a further embodiment, the ball spinning device further comprises a marking utensil alignment ring with a recess configured to receive a tip of a marking utensil, the marking utensil alignment ring configured to be supported on a peripheral rim of the concave cup portion of the device body.

In still a further embodiment, the marking utensil alignment ring further includes a ball pickup shelf configured to lift up the ball when the marking utensil alignment ring is lifted off the concave cup portion of the device body.

In yet a further embodiment, the marking utensil alignment ring further includes an inner peripheral shelf disposed on an underside of the marking utensil alignment ring, the inner peripheral shelf configured to rest on the peripheral rim of the concave cup portion of the device body.

In accordance with one or more other embodiments of the present invention, there is provided a ball spinning device for dynamically balancing a ball. The ball spinning device includes a device body, the device body including a concave cup portion for receiving a portion of a ball that is to be dynamically balanced, the concave cup portion having an air discharge aperture configured to discharge a stream of pressurized air at an outer surface of the ball, the air discharge aperture being spaced a predetermined distance apart from a center point of the concave cup portion; and a pressurized air source fluidly coupled to the air discharge aperture of the concave cup portion, the pressurized air source configured to deliver the pressurized air to the air discharge aperture so as to induce a rotational displacement of the ball within the concave cup portion until a balanced state of the ball is achieved.

In a further embodiment of the present invention, the pressurized air source comprises an air compressor configured to deliver the pressurized air to the air discharge aperture so as to induce the rotational displacement of the ball.

In accordance with yet one or more other embodiments of the present invention, there is provided a ball spinning device for dynamically balancing a ball. The ball spinning device includes a device body, the device body including a base and a concave cup portion for receiving a portion of a ball that is to be dynamically balanced, the concave cup portion having an air discharge aperture configured to discharge a stream of pressurized air at an outer surface of the ball; and a pressurized air source fluidly coupled to the air discharge aperture of the concave cup portion, the pressurized air source disposed at the base of the device body, the pressurized air source configured to deliver the pressurized air to the air discharge aperture so as to induce a rotational displacement of the ball within the concave cup portion until a balanced state of the ball is achieved.

In a further embodiment of the present invention, the pressurized air source comprises a fan disposed in the base of the device body, the fan configured to deliver the pressurized air to the air discharge aperture so as to induce the rotational displacement of the ball.

In yet a further embodiment, the fan comprises an axial fan configured to discharge the pressurized air parallel to a rotational axis of the axial fan, and wherein the base of the device body includes one or more air inlets for fan intake air.

In still a further embodiment, the fan comprises a centrifugal fan configured to discharge the pressurized air perpendicular to a rotational axis of the centrifugal fan.

In yet a further embodiment, the device body further comprises an air conduit fluidly coupling the pressurized air source at the base of the device body to the air discharge aperture in the concave cup portion of the device body.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
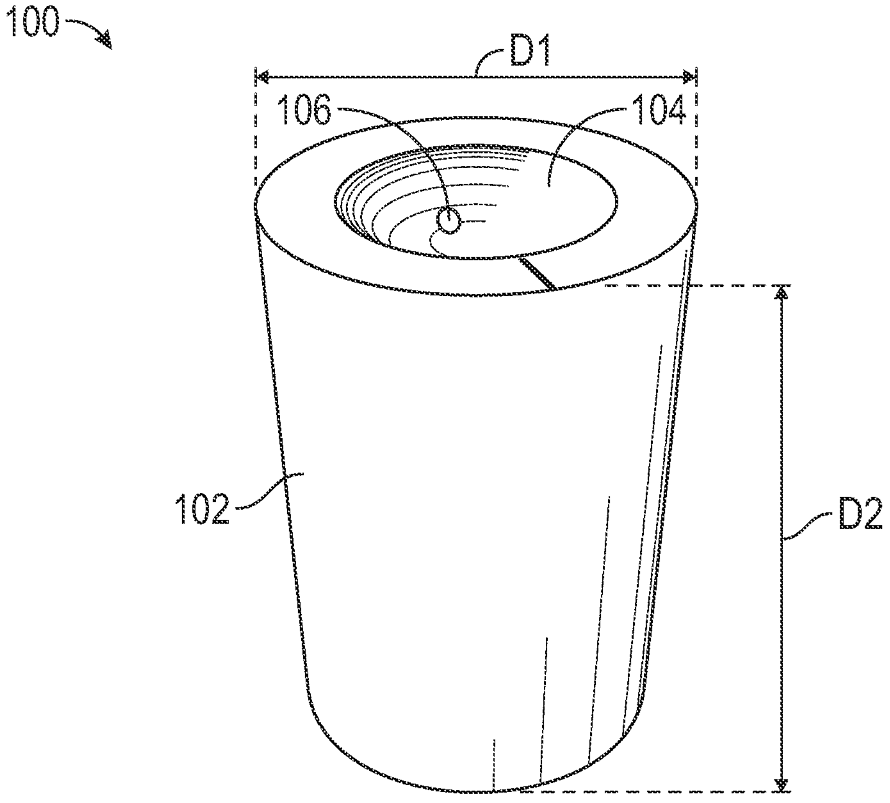
FIG. 1 is a perspective view of a ball spinning device for dynamically balancing a ball, according to a first illustrative embodiment of the invention.

A first illustrative embodiment of a ball spinning device for dynamically balancing a ball is seen generally at 100 in FIGS. 1-3, 6, 8, 9, and 13. In the first illustrative embodiment, referring initially to FIGS. 1, 2, and 13, the ball spinning device 100 generally comprises a device body 102, the device body 102 including a concave cup portion 104 for receiving a portion of a ball (e.g., a golf ball 130—FIG. 13) that is to be dynamically balanced, the concave cup portion 104 having an air discharge aperture 106 configured to discharge a stream of pressurized air at an outer surface of the ball 130; and a pressurized air source (e.g., an air compressor 134 connected to air line 132) fluidly coupled to the air discharge aperture 106 of the concave cup portion 104, the pressurized air source configured to deliver the pressurized air to the air discharge aperture 106 so as to induce a rotational displacement of the ball 130 within the concave cup portion 104 until a balanced state of the ball 130 is achieved. In the first illustrative embodiment, the air compressor or other type of pressurized air source may be configured to deliver pressurized air of at least 25.0 pounds per square inch (i.e., at least 25 psi).

In the first illustrative embodiment, as one example, the device body 102 of the ball spinning device 100 may have an overall width or diameter D1 of approximately 52.45 millimeters and an overall height D2 of 75.20 millimeters (refer to FIG. 1). In other embodiments, it is to be understood that other suitable dimensions may be used for the device body 102 of the ball spinning device 100.

Figure 2:
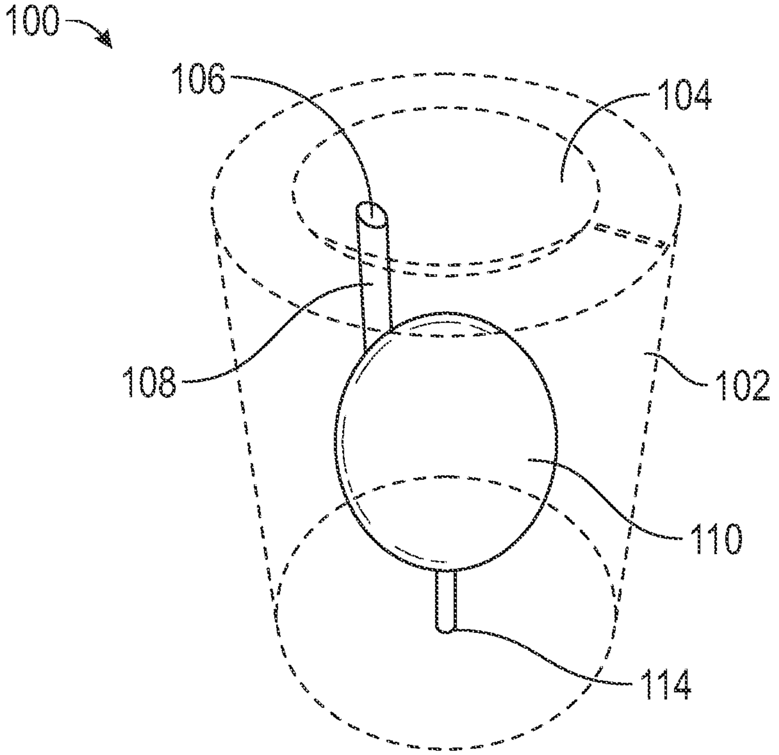
FIG. 2 is another perspective view of the ball spinning device of FIG. 1, wherein the device body portion is depicted in a transparent manner so as to illustrate the internal features of the ball spinning device.
Figure 8:
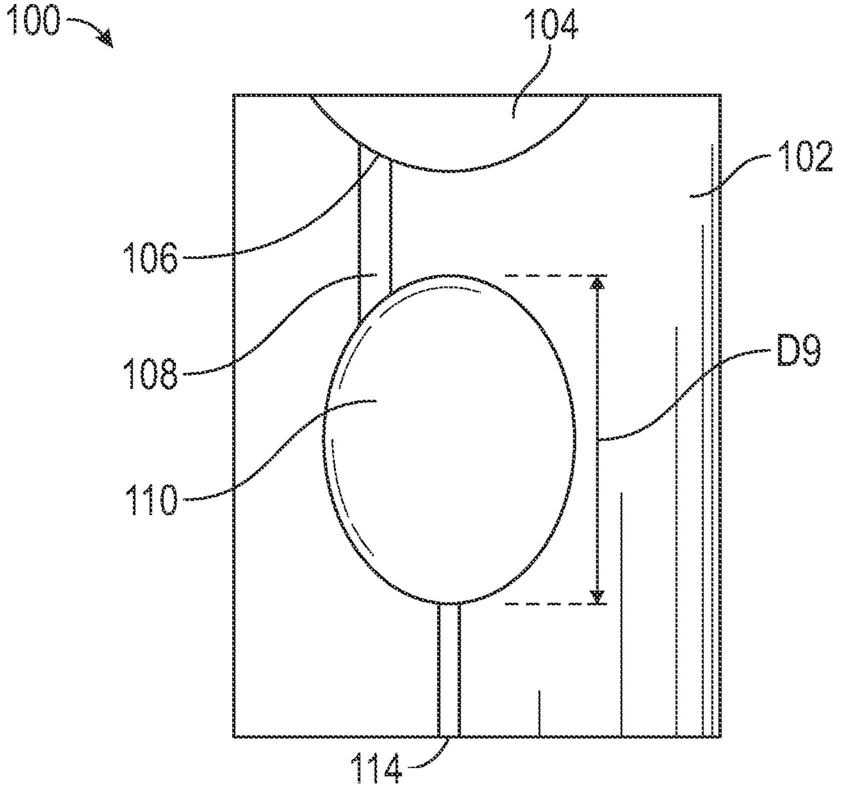
FIG. 8 is a side internal elevational view of the ball spinning device of FIG. 1, wherein an exemplary height of the internal air chamber is illustrated.
Figure 9:
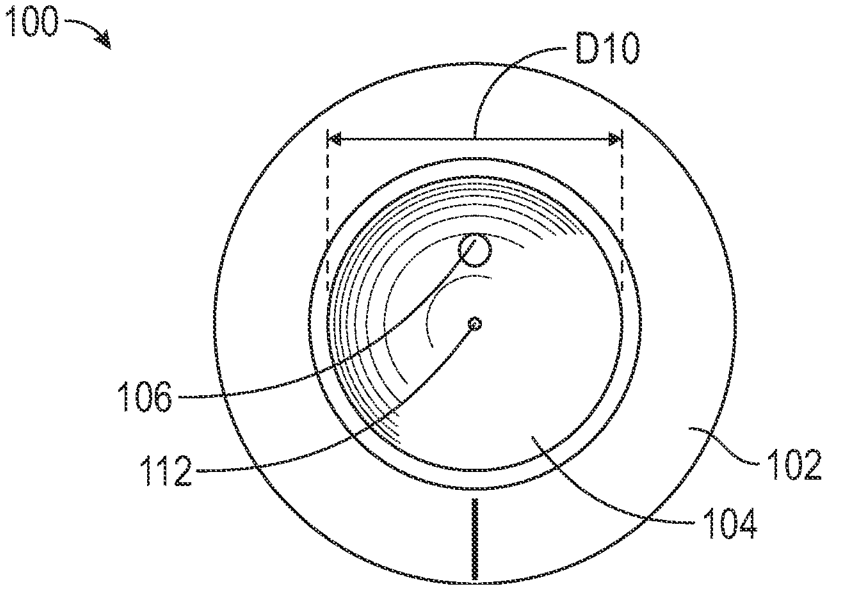
FIG. 9 is another top plan view of the ball spinning device of FIG. 1, wherein an exemplary width of the internal air chamber is illustrated.
Figure 13:
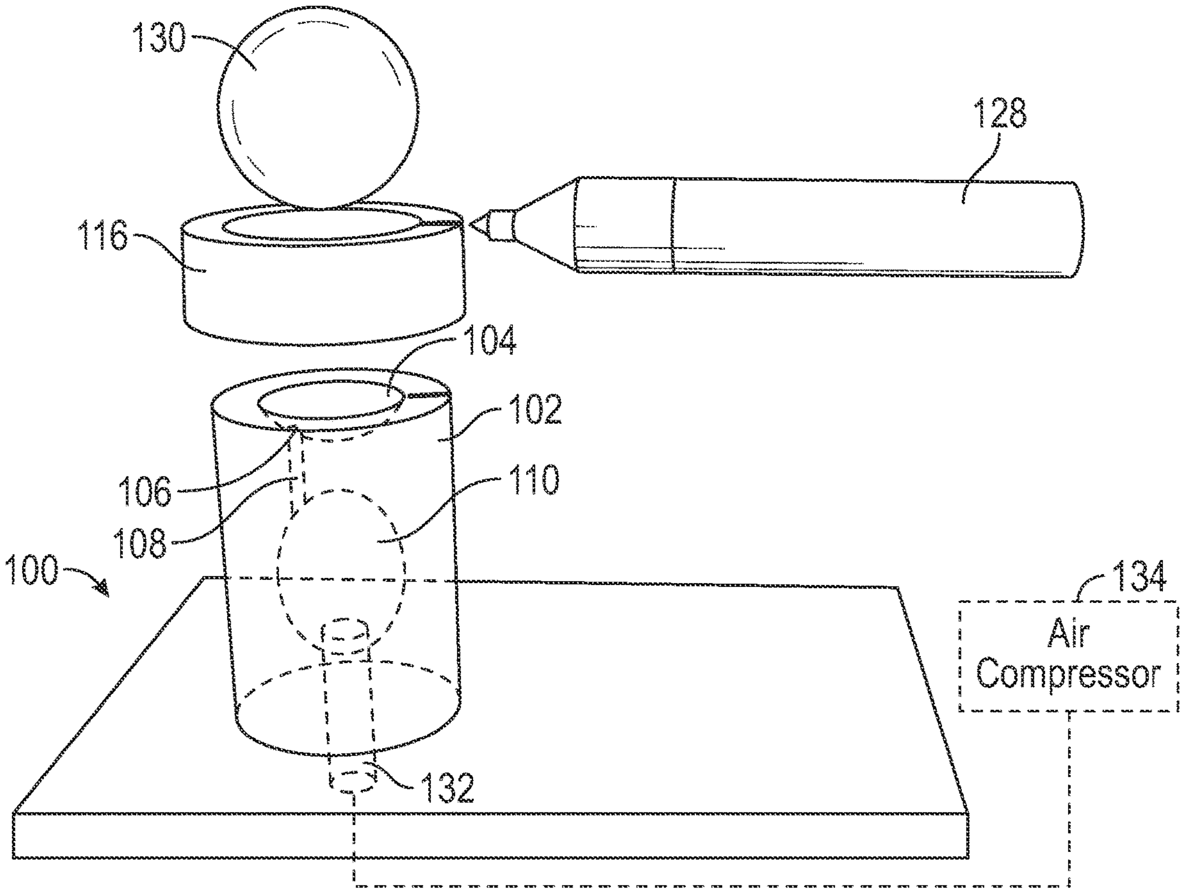
FIG. 13 is a perspective view of an illustrative golf ball marking system that includes the ball spinning device of FIG. 1, the marking utensil alignment ring of FIG. 10, and a marking utensil, wherein the ball spinning device of FIG. 1 is depicted in a transparent manner so as to illustrate the internal features of the ball spinning device.

Referring to FIGS. 2, 8, and 13, in the first illustrative embodiment, the device body 102 of the ball spinning device 100 further comprises an internal air chamber 110 fluidly coupled to the air discharge aperture 106. The internal air chamber 110 is configured to hold a volume of pressurized air so as to minimize a disruption to the rotational displacement of the ball 130 when the pressurized air source cycles on and off (e.g., when the air compressor cycles on and off). That is, the internal air chamber 110 operates as a "reserve capacitor" that stores air when the air compressor turns off. Also, as shown in the first illustrative embodiment of FIGS. 2, 8, and 13, the device body 102 further comprises an air passageway or air conduit 108 fluidly coupling the internal air chamber 110 to the air discharge aperture 106.

Figure 3:
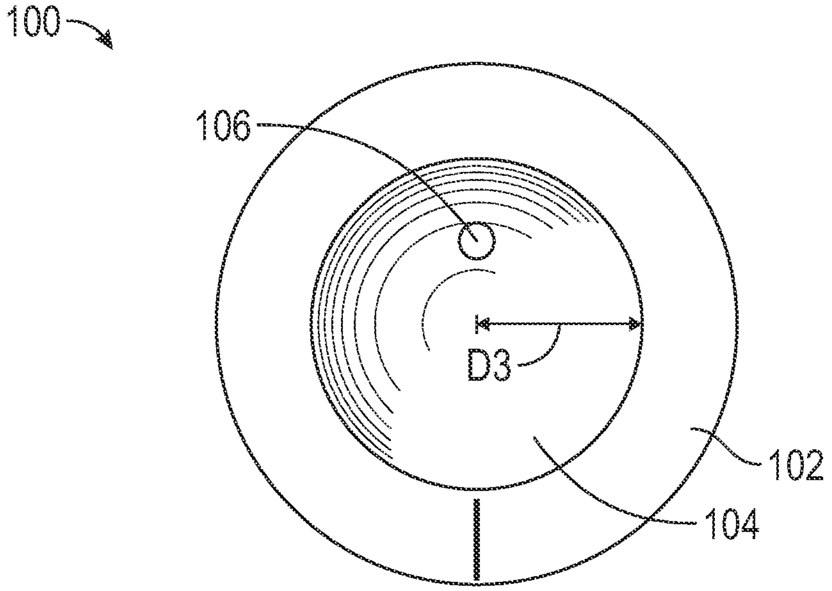
FIG. 3 is a top plan view of the ball spinning device of FIG. 1, wherein an exemplary radius of the cup portion is illustrated.
Figure 4:
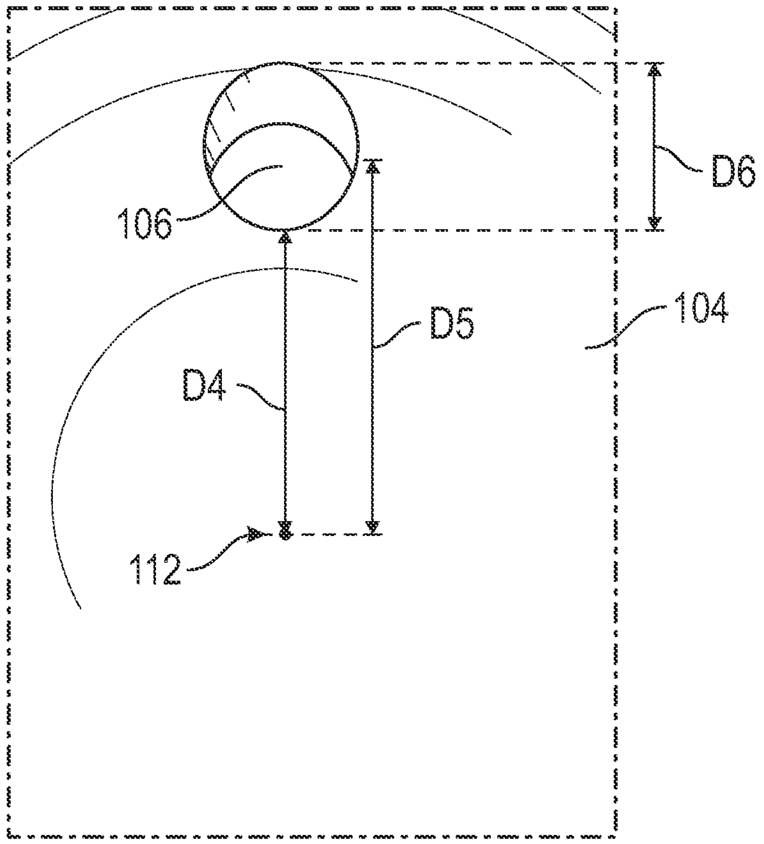
FIG. 4 is a partial top plan view of the cup portion of the ball spinning device of FIG. 1, wherein an exemplary distance between the center of the cup portion and the front tangent point of the air discharge aperture is illustrated, an exemplary distance between the center of the cup portion and the center point of the air discharge aperture is illustrated, and an exemplary radius of the air discharge aperture is illustrated.

The concave cup portion 104 of the ball spinning device 100 will be described in more detail with reference to the top views depicted in FIGS. 3 and 4. As shown in these figures, in the first illustrative embodiment, the air discharge aperture 106 is spaced a predetermined distance apart from a center point 112 of the concave cup portion 104. For example, as shown in FIG. 4, the distance D4 between the center point 112 of the concave cup portion 104 and a tangent point of the air discharge aperture 106 may be approximately 7.25 millimeters. Also, for example, the distance D5 between the center point 112 of the concave cup portion 104 and a center point of the air discharge aperture 106 may be approximately 9.0 millimeters. As another example, in the first illustrative embodiment, the concave cup portion 104 may have a radius D3 of approximately 16.87 millimeters (refer to FIG. 3). As yet another example, in the first illustrative embodiment, the air discharge aperture 106 in the concave cup portion 104 may be circular in shape, and have a diameter D6 of approximately 3.5 millimeters (refer to FIG. 4).

Figure 5:
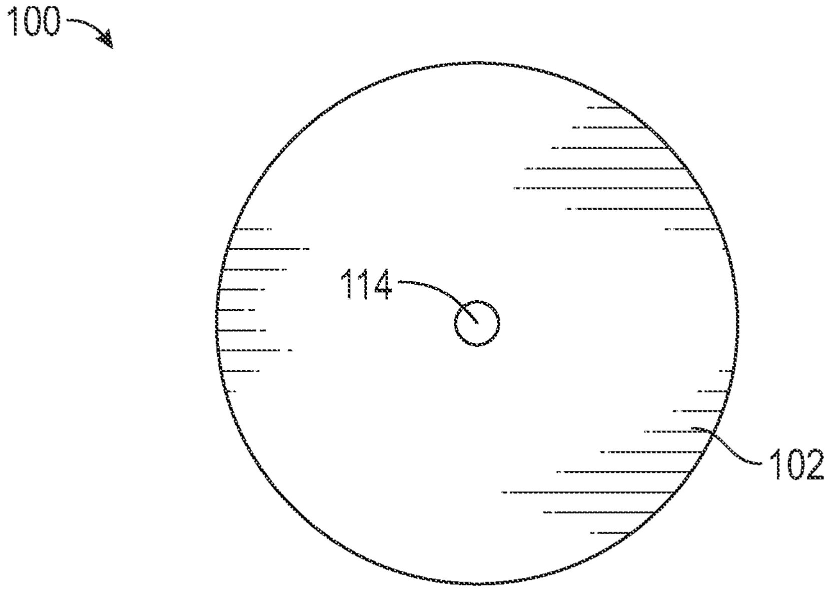
FIG. 5 is a bottom plan view of the ball spinning device of FIG. 1.
Figure 6:
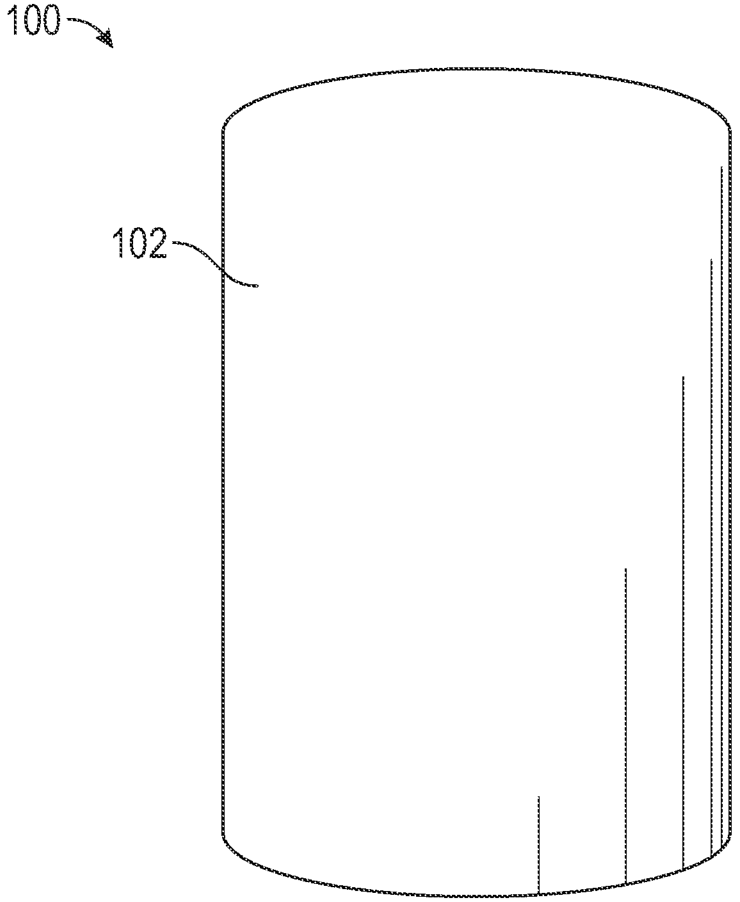
FIG. 6 is a side perspective view of the ball spinning device of FIG. 1.

In the first illustrative embodiment, with reference to FIG. 5, the bottom of the device body 102 of the ball spinning device 100 may comprise an air inlet aperture 114 for receiving the air line 132 or a compression fitting of the pressurized air source (e.g., the air compressor).

Figure 7:
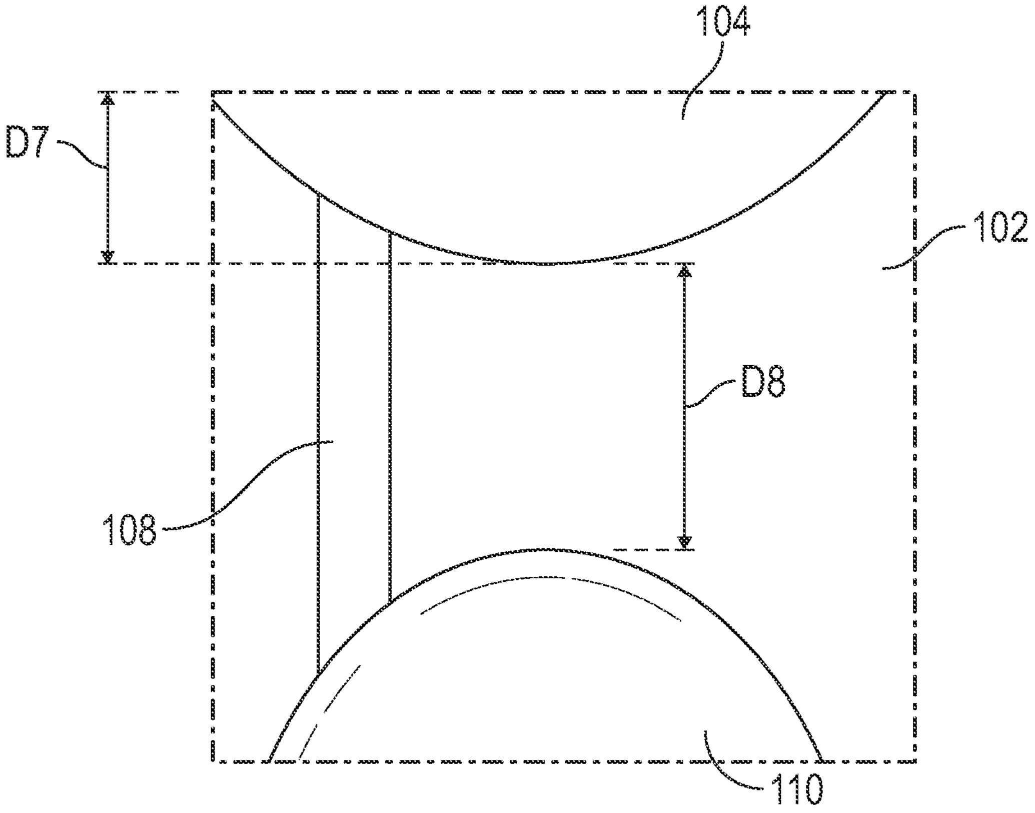
FIG. 7 is a partial side internal elevational view of the ball spinning device of FIG. 1, wherein an exemplary depth of the cup portion is illustrated, and an exemplary distance between the bottom of the cup portion and the internal air chamber is illustrated.

In the first illustrative embodiment, as one example, the concave cup portion 104 of the device body 102 may have an overall depth D7 of approximately 9.6 millimeters (refer to FIG. 7). As another example, in the first illustrative embodiment, the distance D8 between the bottom of the concave cup portion 104 and the top of the internal air chamber 110 may be approximately 13.0 millimeters (see FIG. 7). As yet another example, in the first illustrative embodiment, the height D9 of the internal air chamber 110 may be approximately 40.12 millimeters (refer to FIG. 8), and the width D10 of the internal air chamber 110 may be approximately 30.02 millimeters (see FIG. 9). Also, in the first illustrative embodiment, the internal air chamber 110 may have a shape that resembles a prolate spheroid or egg (refer to FIG. 8). In other embodiments, it is to be understood that other suitable dimensions and shapes may be used for the components of the device body 102 of the ball spinning device 100.

Figure 10:
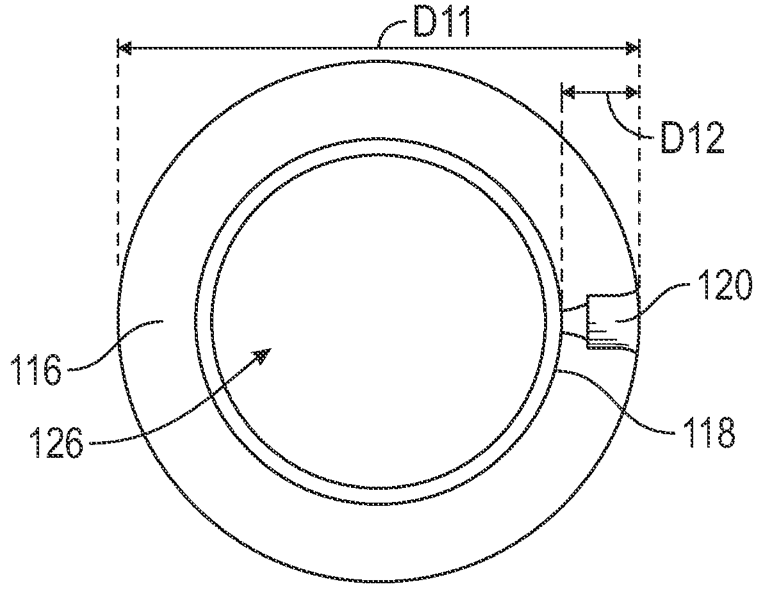
FIG. 10 is a top plan view of a marking utensil alignment ring that is used with the ball spinning device of FIG. 1, wherein an exemplary outside diameter of the marking utensil alignment ring is illustrated, and an exemplary length of a pen tip recess in the marking utensil alignment ring is illustrated.
Figure 11:
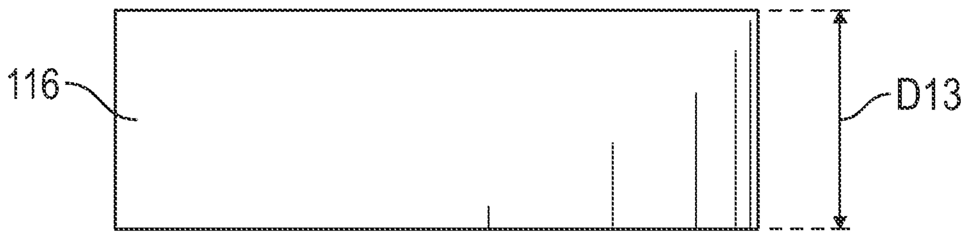
FIG. 11 is a side elevational view of the marking utensil alignment ring of FIG. 10, wherein an exemplary height of the marking utensil alignment ring is illustrated.
Figure 12:
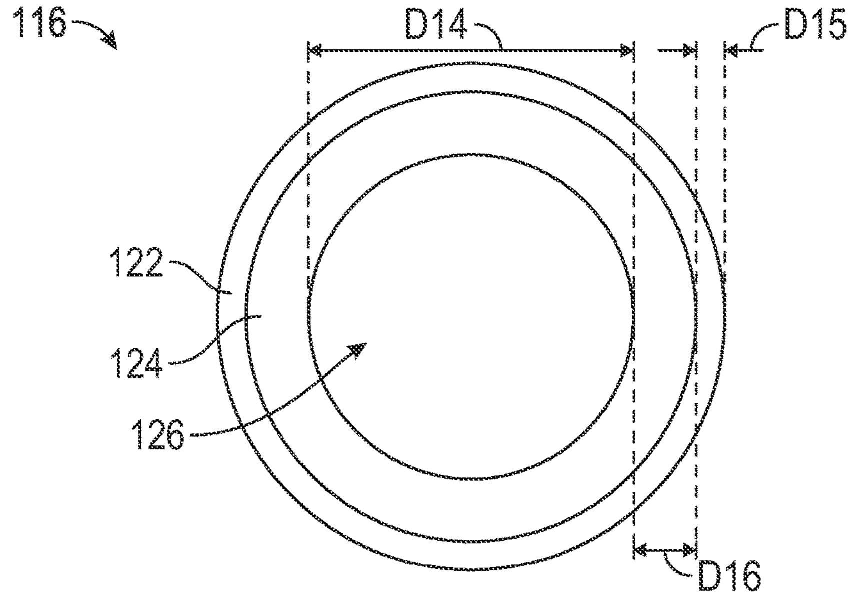
FIG. 12 is a bottom plan view of the marking utensil alignment ring of FIG. 10, wherein an exemplary inside diameter of a ball pickup shelf of the marking utensil alignment ring is illustrated, an exemplary width of a wall sleeve of the marking utensil alignment ring is illustrated, and an exemplary width of an inner peripheral shelf of the marking utensil alignment ring is illustrated.

Now, with reference to FIGS. 10-13, a marking utensil alignment ring 116 that may be used with the ball spinning device 100 of the first illustrative embodiment will be described. Initially, as shown in FIG. 10, the marking utensil alignment ring 116 comprises a pen tip recess 120 configured to receive a tip of a marking utensil (e.g., a marking pen 128, such as a Sharpie® pen—see FIG. 13). As shown in FIG. 13, the marking utensil alignment ring 116 is configured to be supported on a peripheral rim of the concave cup portion 104 of the device body 102 of the ball spinning device 100. As shown in FIG. 10, the marking utensil alignment ring 116 may further comprise a ball pickup shelf 118 configured to lift up the ball 130 when the marking utensil alignment ring 116 is lifted off the concave cup portion 104 of the device body 102. The ball pickup shelf 118 circumscribes a central ball aperture 126 of the marking utensil alignment ring 116. Also, as illustrated in FIG. 12, the marking utensil alignment ring 116 may further comprise a wall sleeve 122 and an inner peripheral shelf 124 disposed on an underside of the marking utensil alignment ring 116. The inner peripheral shelf 124 of the marking utensil alignment ring 116 is configured to rest on the peripheral rim of the concave cup portion 104 of the device body 102 when the marking utensil alignment ring 116 is being used to mark a ball 130 on the ball spinning device 100 (see FIG. 13).

Referring again to FIGS. 10-12, example dimensions for the elements of the marking utensil alignment ring 116 will be described. As one example, in the first illustrative embodiment, the marking utensil alignment ring 116 may have an overall diameter D11 of approximately 60.0 millimeters and an overall height D13 of approximately 20.0 millimeters (refer to FIGS. 10 and 11). As another example, in the first illustrative embodiment, the pen tip recess 120 of the marking utensil alignment ring 116 may have a length D12 of approximately 9.25 millimeters (see FIG. 10). As yet another example, the ball pickup shelf 118 of the marking utensil alignment ring 116 may have an inside diameter D14 of 38.52 millimeters (refer to FIG. 12). As still other examples, the wall sleeve 122 of the marking utensil alignment ring 116 may have a width D15 of approximately 3.70 millimeters, and the inner peripheral shelf 124 of the marking utensil alignment ring 116 may have a width D16 of approximately 7.20 millimeters (see FIG. 12). In other embodiments, it is to be understood that other suitable dimensions may be used for the elements of the marking utensil alignment ring 116 of the ball spinning device 100.

Next, the operation of an illustrative golf ball marking system that utilizes the ball spinning device 100 of FIG. 1 will be described with reference to FIG. 13. As described above, the concave cup portion 104 of the ball spinning device 100 is configured to hold a golf ball 130. The marking utensil alignment ring 116 then slides on top of the ball spinning device 100, which when seated against the ball spinning device 100, does not impede the golf ball 130 from moving. The golf ball 130 initially sits on the concave cup portion 104 with no air or gas pressure applied. During the operation of the ball spinning device 100, the air discharge aperture 106 streams pressurized air or inert gas (such as nitrogen) from a pressure that can be varied between 25 psi to 100 psi. For example, air may be supplied to the internal air chamber 110 of the ball spinning device 100 at a pressure between approximately 35 psi and approximately 50 psi. The higher the pressure on the internal air chamber 110, the faster the exit stream of air or gas, and the faster the ball 130 will spin to a balanced state. A measured balance state of the ball 130 has been observed using a tachometer to a speed of a spun golf ball to over 6,000 rpm to as high as 20,000 rpm. This balanced state can be determined in a number of ways without a tachometer. It can be determined by time, e.g., usually less than 1 minute of spinning from start of pressure applied to the chamber. The balanced state also can be determined by sound as the ball will impart a high frequency sound that peaks in frequency when the ball is balanced, again in about 1 minute. In addition, the balanced state can be determined if a bright light is shining on the surface of the ball 130; a visual reflection of the light will display an interference pattern that moves slower and slower until it becomes nearly stationary (i.e., indicating a balanced state), again in about 1 minute or less. Once the balanced state of the ball 130 is achieved, a standard marking pen 128 (e.g., Sharpie® pen) is inserted into the pen tip recess 120 of the marking utensil alignment ring 116 very carefully to just lightly touch the surface of the golf ball 130 while it is still spinning. This creates a very fine line on the ball 130 that is indicative of the balanced plane of the ball 130. Once the ball 130 is marked, pressure to the internal air chamber 110 is stopped via a needle valve that controls the applied air pressure and the ball 130 slows to a stop. A user can also just lift marking utensil alignment ring 116 even if pressurized air is still being applied, and the ball 130 will be lifted away from the ball spinning device 100 by the marking utensil alignment ring 116 and the rotation of the ball 130 will slow to a stop in about 10 seconds.

In an alternative embodiment, the marking of the ball 130 could be performed by firing a laser to the middle top of the golf ball 130 while the ball 130 is spin-balanced using parameters common to marking thermoplastic marking lasers such as a YAG, YVO4, UV or fiber lasers to mark on the ball surface.

A second illustrative embodiment of the ball spinning device is seen generally at 200 in FIGS. 14-19. Referring to these figures, it can be seen that, in many respects, the second illustrative embodiment is similar to that of the first illustrative embodiment. Moreover, many elements are common to both such embodiments. For the sake of brevity, the elements that the second embodiment of the ball spinning device has in common with the first embodiment will not be discussed in detail because these components have already been described above.

Like the ball spinning device 100 described above, the ball spinning device 200 of the second illustrative embodiment generally comprises a device body 202, the device body 202 including a concave cup portion 204 for receiving a portion of a ball (e.g., a golf ball) that is to be dynamically balanced, the concave cup portion 204 having an air discharge aperture 206 configured to discharge a stream of pressurized air at an outer surface of the ball; and a pressurized air source fluidly coupled to the air discharge aperture 206 of the concave cup portion 204, the pressurized air source configured to deliver the pressurized air to the air discharge aperture 206 so as to induce a rotational displacement of the ball within the concave cup portion 204 until a balanced state of the ball is achieved. Although, unlike the ball spinning device 100 of the first embodiment that has a remote pressurized air source (e.g., a remote air compressor), the pressurized air source of the ball spinning device 200 comprises a fan 210 disposed in the base of the device body 202 (see FIG. 16). In the second illustrative embodiment, the fan is configured to deliver the pressurized air to the air discharge aperture 206 so as to induce the rotational displacement of the ball (e.g., the golf ball).

Figure 18:
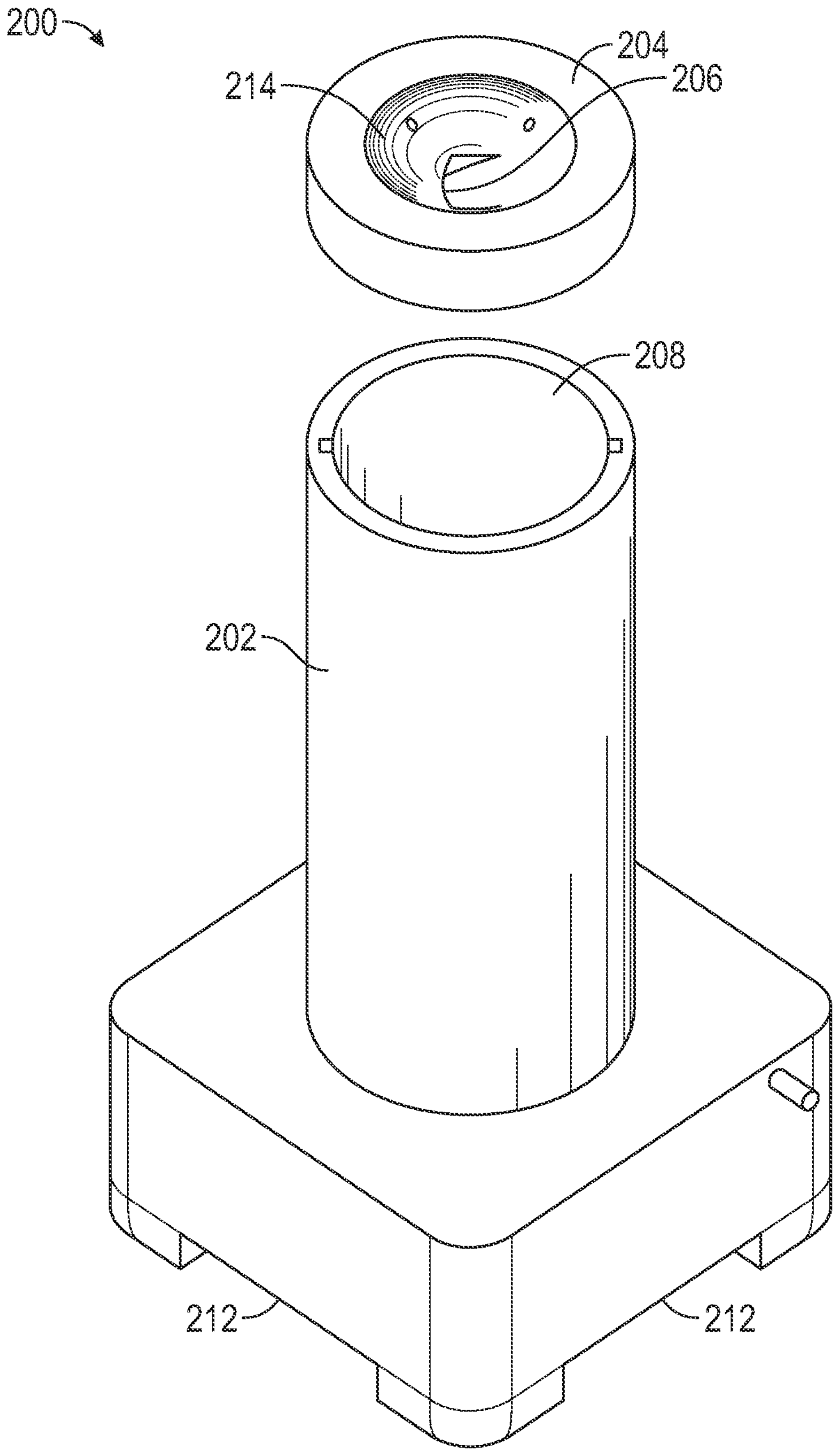
FIG. 18 is another partially exploded perspective view of the ball spinning device of FIG. 14.
Figure 19:
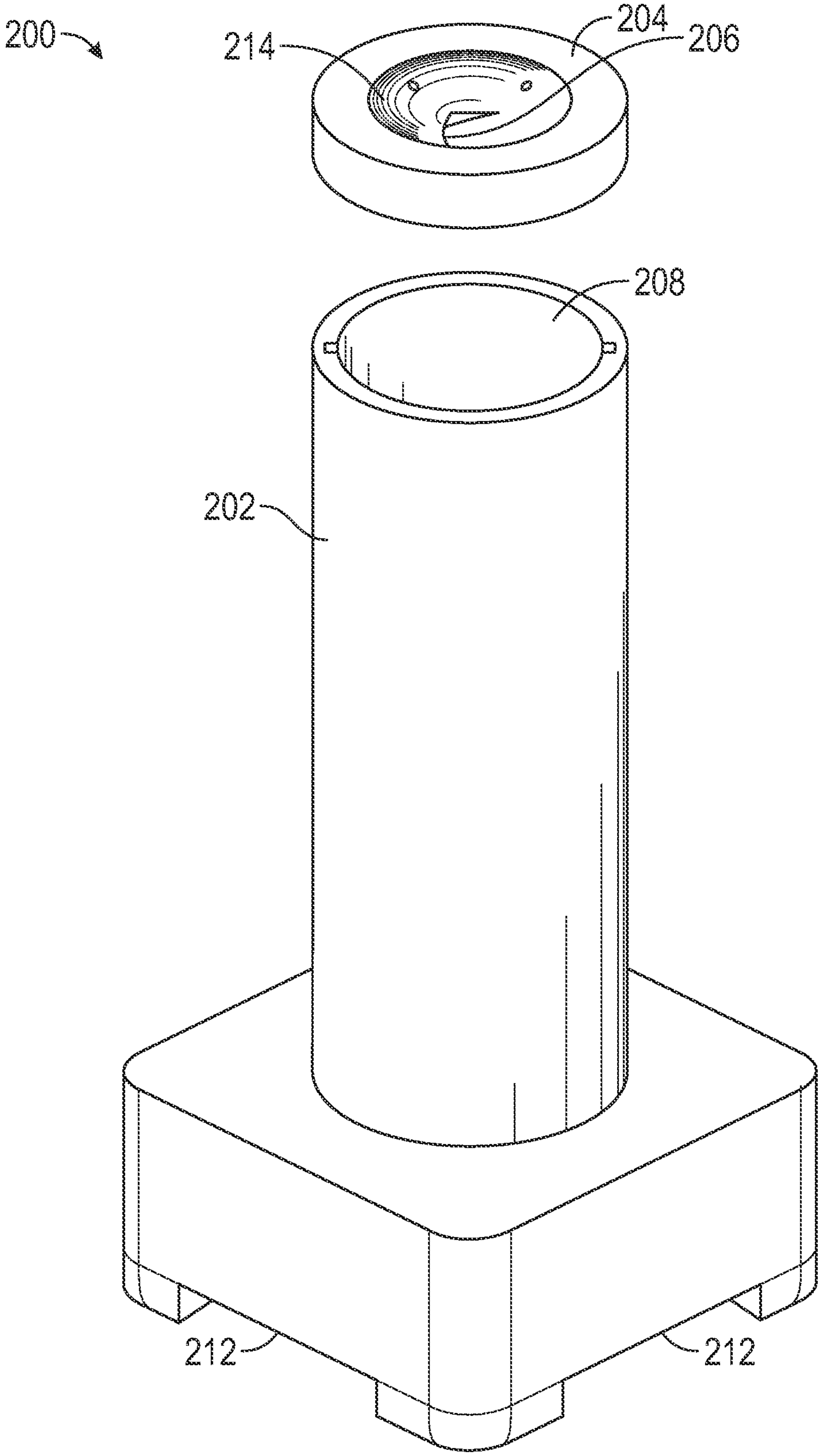
FIG. 19 is yet another partially exploded perspective view of the ball spinning device of FIG. 14.
Figure 20:
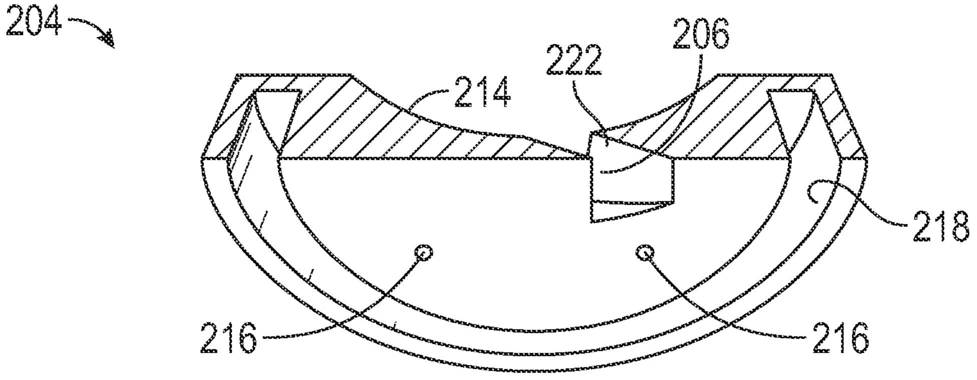
FIG. 20 is a bottom cutaway perspective view of the cup portion of the ball spinning device of FIG. 14.
Figure 21:
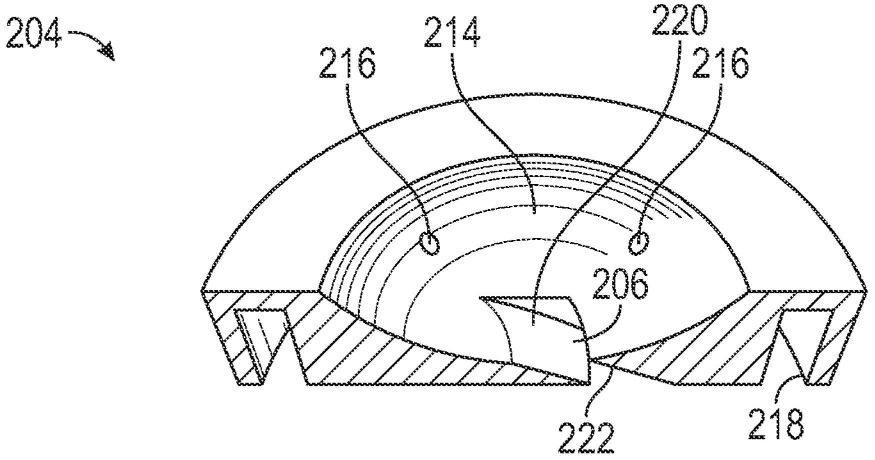
FIG. 21 is a top cutaway perspective view of the cup portion of the ball spinning device of FIG. 14.
Figure 22:
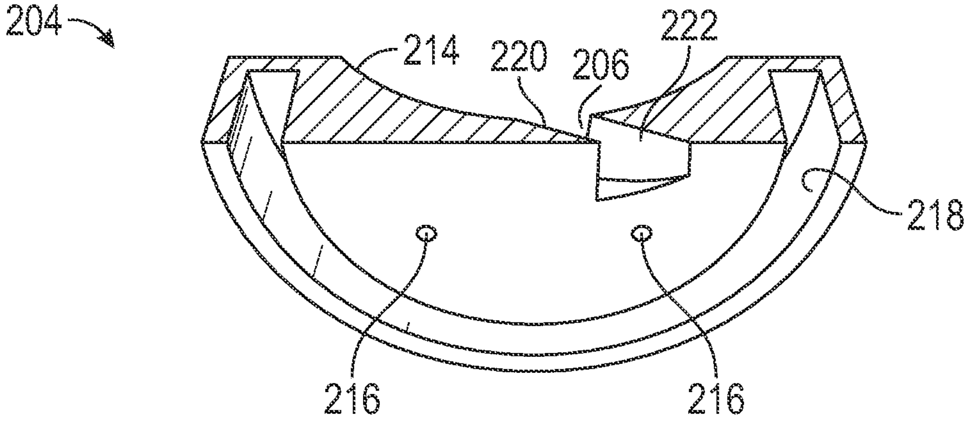
FIG. 22 is another bottom cutaway perspective view of the cup portion of the ball spinning device of FIG. 14.
Figure 23:
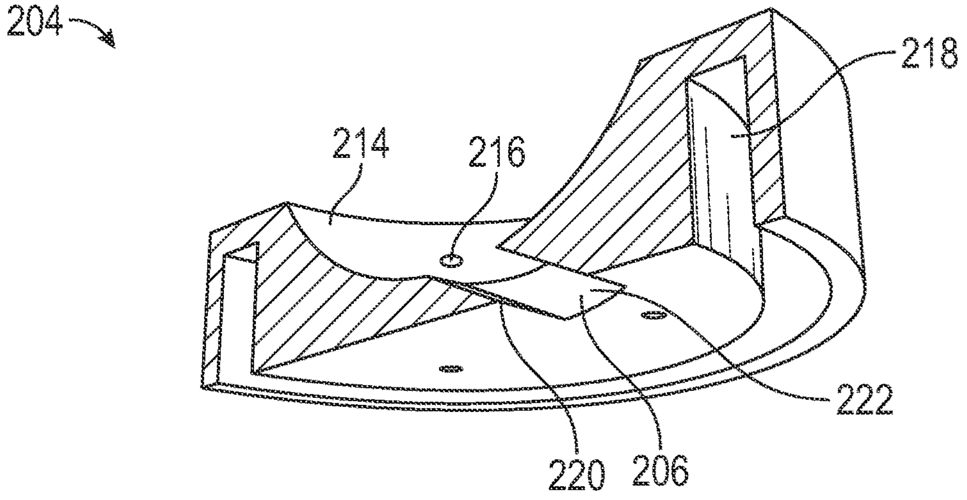
FIG. 23 is a side cutaway perspective view of the cup portion of the ball spinning device of FIG. 14.

Referring to FIGS. 18 and 19, in the second illustrative embodiment, the device body 202 of the ball spinning device 100 further comprises an air passageway or air conduit 208 fluidly coupling the fan 210 disposed in the base of the device body 202 to the air discharge aperture 206 in the concave cup portion 204 of the device body 202.

Figure 15:
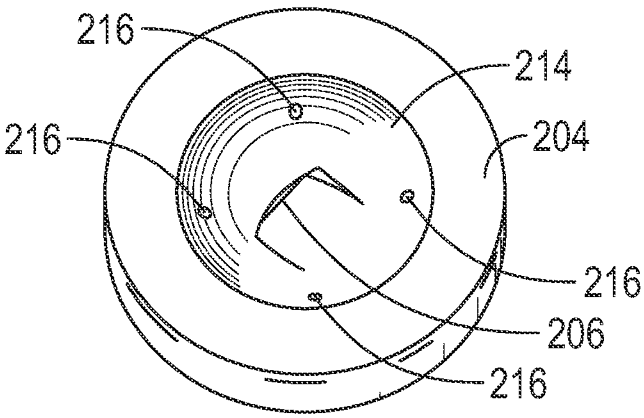
FIG. 15 is a top perspective view of a cup portion of the ball spinning device of FIG. 14.

The concave cup portion 204 of the ball spinning device 200 will be described in more detail with reference to FIGS. 15, 17, 18, and 20-23. As shown in these figures, in the second illustrative embodiment, the air discharge aperture 206 of the concave cup portion 204 is in the form of an elongate slot. The air discharge slot 206 is disposed in an approximate central location of the concave ball receiving portion 214 of the concave cup portion 204. With combined reference to FIGS. 20-23, the air discharge slot 206 is bounded by a sloped bottom wall 220 and a sloped top wall 222 such that the pressurized air is directed diagonally at the side surface of the ball during the spinning thereof. In addition, as best shown in FIG. 15, it can be seen that the concave ball receiving portion 214 of the concave cup portion 204 further comprises a plurality of smaller peripheral air apertures 216 for elevating the ball slightly above the surface of the concave ball receiving portion 214 (i.e., the peripheral air apertures 216 allow the ball to "float" on a cushion of air above the surface of the concave ball receiving portion 214 while the spinning of the ball is induced by the diagonal air jet emitted from the elongate air discharge slot 206). In the second illustrative embodiment, four (4) peripheral air apertures 216 are provided in the concave cup portion 204, but a different quantity of peripheral air apertures 216 may be used in other embodiments.

Figure 14:
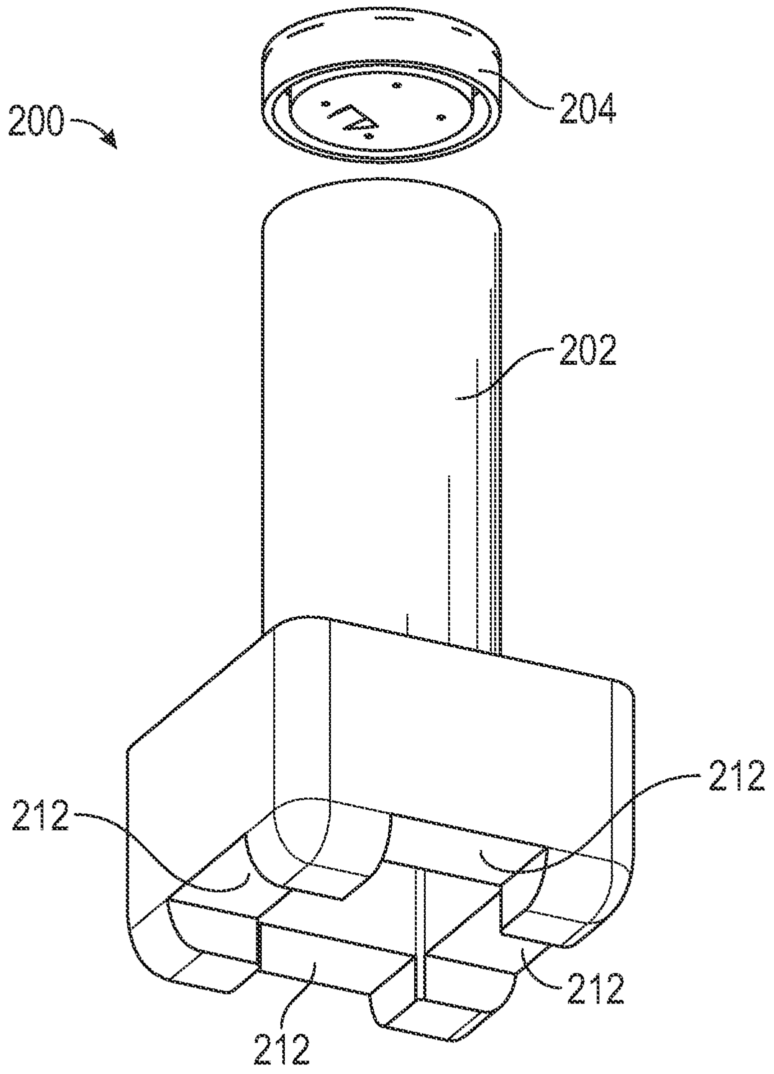
FIG. 14 is a partially exploded perspective view of a ball spinning device for dynamically balancing a ball, according to a second illustrative embodiment of the invention.

Referring again to FIGS. 20-23 of the second illustrative embodiment, it can be seen that the concave cup portion 204 of the ball spinning device 200 further comprises an annular recess 218 that is configured to receive the upper peripheral edge of the air passageway or air conduit 208 of the device body 202 (see FIGS. 14, 18, and 19). That is, the upper peripheral edge of the air passageway or air conduit 208 of the device body 202 is designed to be inserted into the annular recess 218 of the concave cup portion 204 when the concave cup portion 204 is affixed to the remainder of the device body 202.

Figure 16:
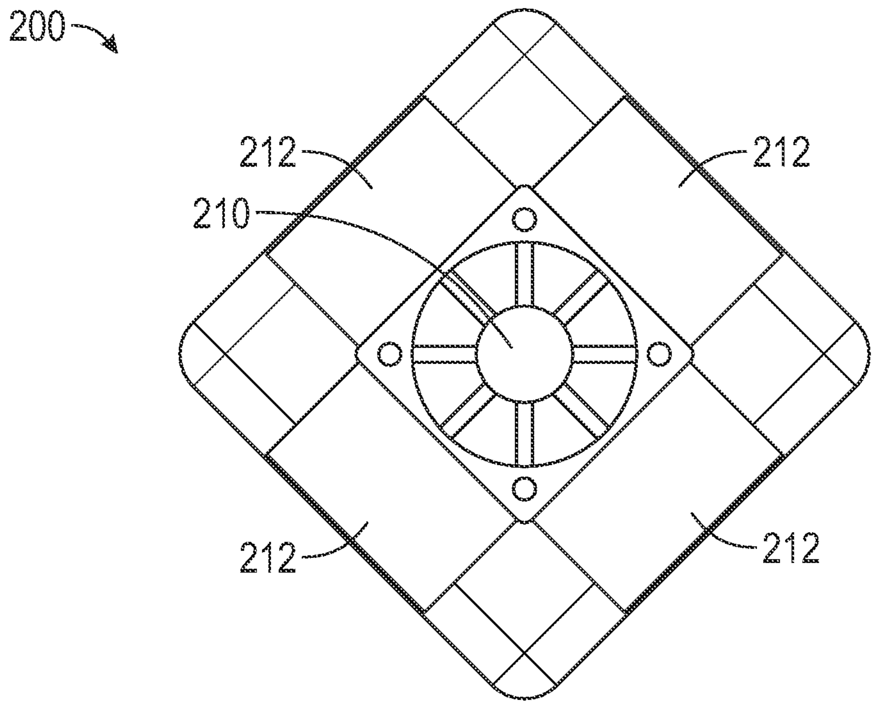
FIG. 16 is a bottom perspective view of the ball spinning device of FIG. 14.
Figure 17:
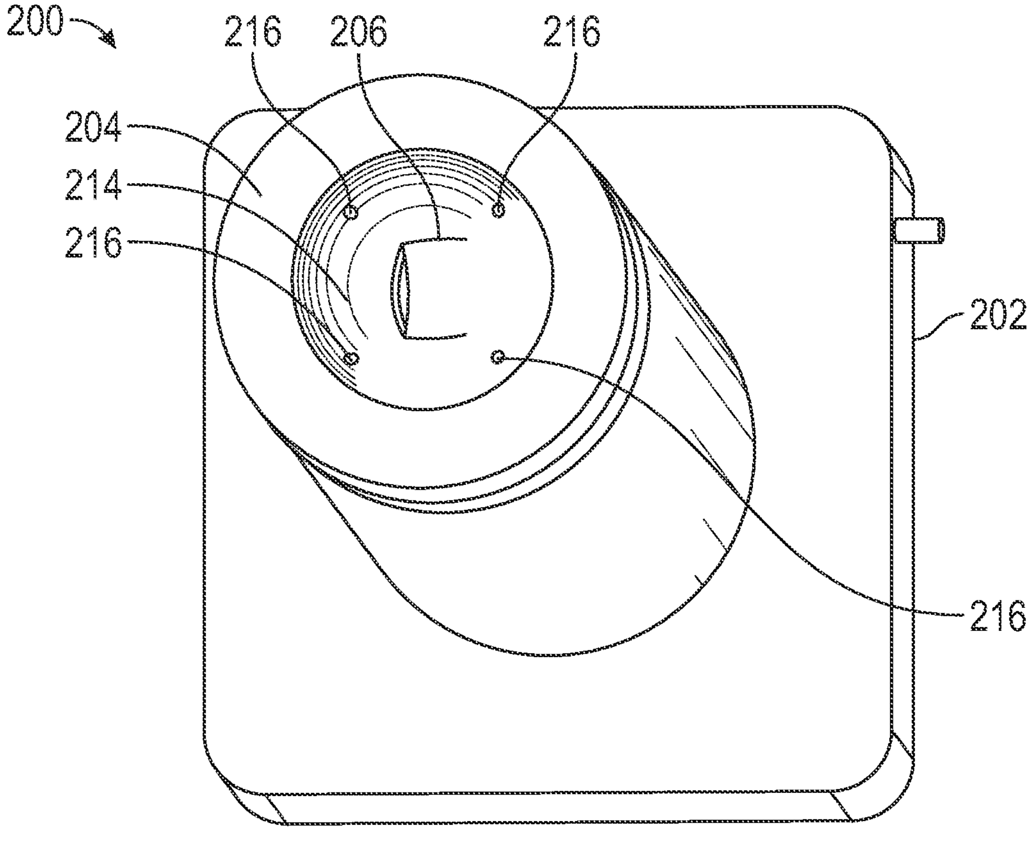
FIG. 17 is a top perspective view of the ball spinning device of FIG. 14.

In the second illustrative embodiment, with reference to FIGS. 14, 16, and 19, it can be seen that the base of the device body 202 of the ball spinning device 200 includes a plurality air inlets 212 for fan intake air. In the second illustrative embodiment, four (4) air inlets 212 are provided in the base of the device body 202, but a different quantity of air inlets 212 may be used in other embodiments. As best shown in the bottom view of FIG. 16, in the second illustrative embodiment, the fan 210 comprises an axial fan configured to discharge the pressurized air parallel to a rotational axis of the axial fan, and parallel to the air passageway or air conduit 208 of the device body 202.

Figure 24:
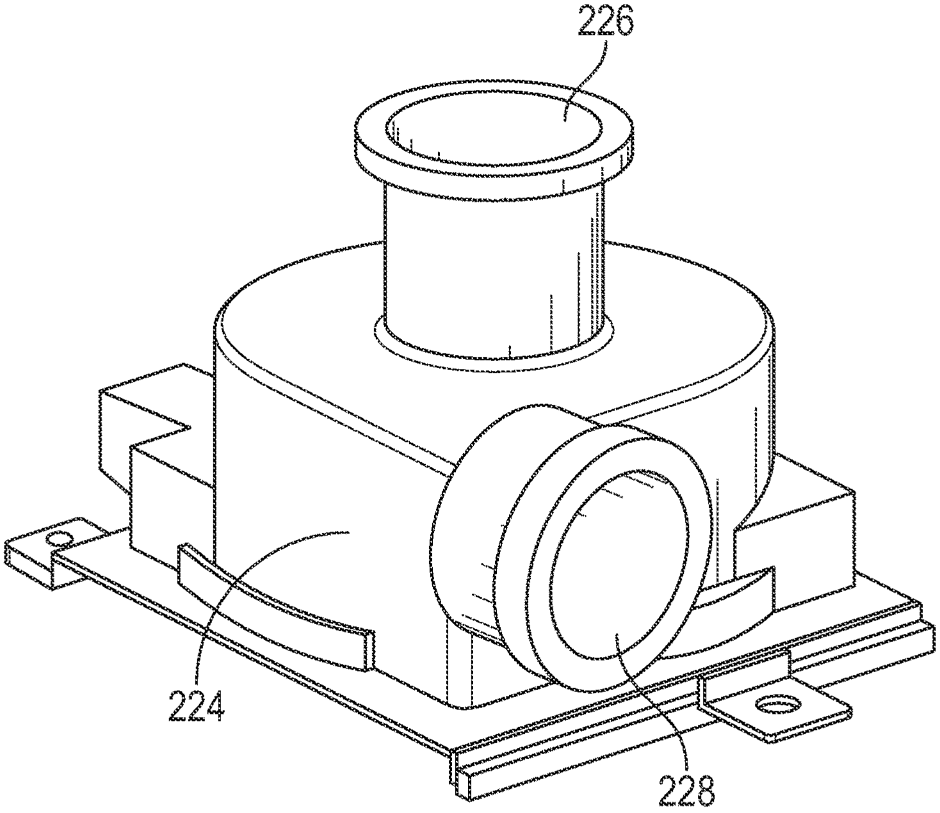
FIG. 24 is a perspective view of a centrifugal fan that may be used with the embodiments of the ball spinning device described herein.

Rather than using an axial fan as illustrated in FIG. 16, it is to be understood that, in other embodiments, the ball spinning device 200 may utilize a centrifugal fan configured to discharge the pressurized air perpendicular to a rotational axis of the centrifugal fan. For example, a compact centrifugal fan, such as the one depicted in FIG. 24 may be used as the pressurized air source of the ball spinning device 200 by slightly modifying the housing of the device 200 to accommodate the centrifugal-type fan. As shown in FIG. 24, the illustrative centrifugal fan 224 comprises an air inlet 226 that is perpendicularly oriented relative to the air outlet 228.

For example, a suitable centrifugal high static pressure mini fan that may be used in ball spinning device 200 may have the following performance characteristics: (i) typical operation supply voltage of between 12-24 volts, (ii) power supply current of approximately 0.9 amps, (iii) power consumption of approximately 21 watts, (iv) a minimum flow rate of approximately 5.0 liters/min., and (v) a fan rotational speed range from 6,000 rpm to 45,000 rpm. The centrifugal high static pressure mini fan may have a fan diameter between approximately 50 millimeters and 60 millimeters. As one example, the centrifugal high static pressure mini fan may comprise a micro blower similar to fan model no. TF037E-2000-F by Nidec Copal Electronics.

The operation of the ball spinning device 200 of the second illustrative embodiment is similar in most respects to the operation of the ball spinning device 100 of the first illustrative embodiment, except for a few notable exceptions. First of all, the concave cup portion 204 of the ball spinning device 200 is substantially the same as the concave cup portion 104 of the first illustrative embodiment, except that the air discharge aperture 206, which provides the jet of air for creating the ball spinning action, has been redesigned for lower static pressure fans, thus eliminating the need or use of a compressed source of air or nitrogen. Although, if desired, the ball spinning device 200 may also be used with compressed air or nitrogen at a much lower value, as low as 20 psi with no loss of performance. With the ball spinning device 200, a small fan can produce enough static pressure to produce adequate rotational spin to perform the balancing in about the same amount of time as the higher pressure ball spinning device 100 of the first illustrative embodiment. For example, in the second illustrative embodiment, a fan capable of generating a pressure of 1.5 to 3.0 kilopascals (kPa) or 6-12 in. $H_2O$ will be capable of spinning the ball (e.g., a golf ball) in the concave cup portion 204 of the ball spinning device 200.

It is readily apparent that the aforedescribed ball spinning devices 100, 200 offer numerous advantages. First, the ball spinning devices 100, 200 for dynamically balancing a ball utilize a contactless cushion of air to suspend the ball, while also simultaneously spinning the ball. Secondly, the ball spinning devices 100, 200 allow the ball to be marked during the identification process, which results in a more accurately marked golf ball. Furthermore, the ball spinning devices 100, 200 are able to quickly and easily mark a balanced equator line on a ball to achieve better play performance using the ball. Using the aforedescribed ball spinning devices 100, 200, a ball (e.g., a golf ball) may be marked with a marking pen or with a marking laser. Advantageously, a marking laser is nearly contactless while imparting a faint, but identifiable mark on the ball. The ball spinning devices 100, 200 described above allow a quicker method to be used to identify and mark a ball (e.g., a golf ball) on the axis where the heavy spot is located by using a concave cup portion 104, 204 which has a small air discharge aperture 106, 206 that expels a pressurized stream of air that suspends the ball on a cushion of air, while also rapidly spinning the ball to achieve a balance.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention. It is to be understood that the word "exemplary" is used herein to mean "serving as an example". As such, any embodiment or feature described herein as being "exemplary" is not necessarily preferred or advantageous over any other embodiments or features.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A ball spinning device for dynamically balancing a ball, the ball spinning device comprising:

a device body, the device body including a concave cup portion for receiving a portion of a ball that is to be dynamically balanced, the concave cup portion having an air discharge aperture configured to discharge a stream of pressurized air at an outer surface of the ball, the air discharge aperture comprising one of:

(i) a single air discharge aperture being spaced a first predetermined distance apart from a center point of the concave cup portion, and the single air discharge aperture being spaced a second predetermined distance apart from an outer circumference of the concave cup portion, the first predetermined distance being greater than the second predetermined distance, or (ii) an elongate slot that extends diagonally through a bottom wall of the concave cup portion such that the stream of pressurized air is directed diagonally at the outer surface of the ball; and a pressurized air source fluidly coupled to the air discharge aperture of the concave cup portion, the pressurized air source configured to deliver the pressurized air to the air discharge aperture so as to induce a rotational displacement of the ball within the concave cup portion until a balanced state of the ball is achieved;

wherein the air discharge aperture comprises the single air discharge aperture spaced the first predetermined distance apart from the center point of the concave cup portion, and the single air discharge aperture spaced the second predetermined distance apart from the outer circumference of the concave cup portion, the first predetermined distance being greater than the second predetermined distance.

2. The ball spinning device according to claim 1, wherein the single air discharge aperture is circular in shape.

3. The ball spinning device according to claim 1, wherein the device body further comprises an internal air chamber fluidly coupled to the air discharge aperture, the internal air chamber configured to hold a volume of pressurized air so as to minimize a disruption to the rotational displacement of the ball when the pressurized air source cycles on and off.

4. The ball spinning device according to claim 3, wherein the device body further comprises an air passageway fluidly coupling the internal air chamber to the air discharge aperture.

5. The ball spinning device according to claim 1, wherein the pressurized air source comprises an air compressor configured to deliver the pressurized air to the air discharge aperture so as to induce the rotational displacement of the ball.

6. The ball spinning device according to claim 1, wherein the pressurized air source comprises a fan configured to deliver the pressurized air to the air discharge aperture so as to induce the rotational displacement of the ball.

7. The ball spinning device according to claim 6, wherein the fan comprises an axial fan configured to discharge the pressurized air parallel to a rotational axis of the axial fan.

8. The ball spinning device according to claim 6, wherein the fan comprises a centrifugal fan configured to discharge the pressurized air perpendicular to a rotational axis of the centrifugal fan.

9. The ball spinning device according to claim 1, further comprising a marking utensil alignment ring with a recess configured to receive a tip of a marking utensil, the marking utensil alignment ring configured to be supported on a peripheral rim of the concave cup portion of the device body.

10. The ball spinning device according to claim 9, wherein the marking utensil alignment ring further includes a ball pickup shelf configured to extend underneath a peripheral portion of the ball so as to lift up the ball when the marking utensil alignment ring is lifted off the concave cup portion of the device body.

11. The ball spinning device according to claim 9, wherein the marking utensil alignment ring further includes an inner peripheral shelf disposed on an underside of the marking utensil alignment ring, the inner peripheral shelf configured to rest on the peripheral rim of the concave cup portion of the device body.

12. A ball spinning device for dynamically balancing a ball, the ball spinning device comprising:

a device body, the device body including a concave cup portion for receiving a portion of a ball that is to be dynamically balanced, the concave cup portion having a single circular air discharge aperture configured to discharge a stream of pressurized air at an outer surface of the ball, the single circular air discharge aperture being spaced a first predetermined distance apart from a center point of the concave cup portion, and the single circular air discharge aperture being spaced a second predetermined distance apart from an outer circumference of the concave cup portion, the first predetermined distance being greater than the second predetermined distance; and a pressurized air source fluidly coupled to the air discharge aperture of the concave cup portion, the pressurized air source configured to deliver the pressurized air to the air discharge aperture so as to induce a rotational displacement of the ball within the concave cup portion until a balanced state of the ball is achieved.

13. The ball spinning device according to claim 12, wherein the pressurized air source comprises an air compressor configured to deliver the pressurized air to the air discharge aperture so as to induce the rotational displacement of the ball.

* * * * *